(12) United States Patent
Ramamurthy et al.

(10) Patent No.: US 12,073,411 B2
(45) Date of Patent: Aug. 27, 2024

(54) METHOD TO MANAGE PENDING TRANSACTIONS, AND A SYSTEM THEREOF

(71) Applicant: Visa International Service Association, San Francisco, CA (US)

(72) Inventors: Rakesh Ramamurthy, Bangalore (IN); Sandeep Doddipalli, Bangalore (IN); Rajeev Gangapura Cho Iyer, Bangalore (IN); Sriram Sethumadhavan, Bangalore (IN); Sudhir Krishna V L, Kasaragod (IN); Alkondan Chockalinga Mooppanar, Nagercoil (IN)

(73) Assignee: Visa International Service Association, San Francisco, CA (US)

( * ) Notice: Subject to any disclaimer, the term of this patent is extended or adjusted under 35 U.S.C. 154(b) by 50 days.

(21) Appl. No.: 17/910,074

(22) PCT Filed: Jun. 11, 2020

(86) PCT No.: PCT/US2020/037185
§ 371 (c)(1),
(2) Date: Sep. 8, 2022

(87) PCT Pub. No.: WO2021/251970
PCT Pub. Date: Dec. 16, 2021

(65) Prior Publication Data
US 2023/0100928 A1 Mar. 30, 2023

(51) Int. Cl.
*G06Q 20/10* (2012.01)
*G06Q 20/22* (2012.01)
*G06Q 20/40* (2012.01)

(52) U.S. Cl.
CPC ........... *G06Q 20/407* (2013.01); *G06Q 20/10* (2013.01); *G06Q 20/223* (2013.01)

(58) Field of Classification Search
CPC ..... G06Q 20/10; G06Q 20/407; G06Q 20/223
(Continued)

(56) References Cited

U.S. PATENT DOCUMENTS 7,814,015 B2 10/2010 Benedyk et al.
11,010,368 B1 * 5/2021 Lesner ............... G06Q 30/06
(Continued)

FOREIGN PATENT DOCUMENTS

CA 2634828 C 5/2007
GB 2591602 A * 8/2021 ............. G06F 21/44

*Primary Examiner* — William E Rankins
(74) *Attorney, Agent, or Firm* — The Webb Law Firm

(57) ABSTRACT

A computer-implemented method is provided. A first transaction from a sender made via the sender PSP server to a receiver via a receiver PSP server is identified. When the first transaction is pending, at least one subsequent transaction from the sender to the receiver is detected. Transaction parameters of the at least one subsequent transaction is compared with transaction parameters of the first transaction for determining that the first transaction and the at least one subsequent transaction are associated with a single payment. One or more messages are transmitted, when one of the first transaction and the at least one subsequent transaction is identified as successful to indicate that one of the first transaction and the at least one subsequent transaction is successful and to discard other transactions.

16 Claims, 14 Drawing Sheets

(58) Field of Classification Search
USPC .................................................. 705/35, 39
See application file for complete search history.

(56) References Cited

U.S. PATENT DOCUMENTS

| | | |
|---|---|---|
| 2018/0240097 A1 | 8/2018 | Chauvin et al. |
| 2019/0130386 A1 | 5/2019 | Bhat et al. |
| 2022/0156406 A1* | 5/2022 | Yang .................. G06F 21/6254 |
| 2022/0318925 A1* | 10/2022 | Pei ........................ G06N 3/045 |

* cited by examiner

| Message Type Identifier | Primary Bitmap | Secondary Bitmap | Data Elements |
|---|---|---|---|

FIGURE 4A

| Position | Meaning |
|---|---|
| 0XXX | ISO 8583:1987 |
| 1XXX | ISO 8583:1993 |
| 2XXX | ISO 8583:2003 |

FIGURE 4B

| Position | Meaning |
|---|---|
| X0XX | Reserved by ISO |
| X1XX | Authorisation message |
| X2XX | Financial message |
| X3XX | File action message |
| X4XX | Reversal and chargeback message |
| X5XX | Reconciliation message |
| X6XX | Administrative message |
| X7XX | Fee collection message |
| X8XX | Network management message |
| X9XX | Reserved by ISO |

FIGURE 4C

| Position | Meaning |
|---|---|
| XX0X | Request |
| XX1X | Request response |
| XX2X | Advice |
| XX3X | Advice response |
| XX4X | Notification |
| XX5X | Notification acknowledgement |
| XX6X | Instruction |
| XX7X | Instruction acknowledgement |
| XX8X | Reserved for ISO |
| XX9X | Reserved by ISO |

FIGURE 4D

| Position | Meaning |
|---|---|
| XXX0 | Acquirer |
| XXX1 | Acquirer repeat |
| XXX2 | Issuer |
| XXX3 | Issuer repeat |
| XXX4 | Other |
| XXX5 | Other repeat |

FIGURE 4E

METHOD TO MANAGE PENDING TRANSACTIONS, AND A SYSTEM THEREOF

CROSS-REFERENCE TO RELATED APPLICATION

This application is the United States national phase of International Application No. PCT/US2020/037185 filed Jun. 11, 2020, the entire disclosure of which is hereby incorporated by reference in its entirety.

BACKGROUND

1. Technical Field

The present disclosure relates generally to Person-to-Person (P2P) real-time transactions, and more specifically, to managing pending transactions.

2. Technical Considerations

Person-to-Person (P2P) real-time transactions are electronic money transfers made from one person (a sender) to another person (a receiver) through a P2P payment application. The P2P real-time transactions allow customers to transfer funds immediately from their bank account to another individual's account via the Internet. When a P2P payment application is used for P2P real-time transactions between the sender and the receiver, a transaction may be pending because of various reasons, like limited Internet connectivity, PSP server issues, network bandwidth, network load and the like. When the status of the transaction is pending, the sender may repeat the transaction until the transaction is successful. Once the transaction is successful, the previous pending transactions may succeed or fail. In case the pending transactions succeed, the sender may lose money due to multiple fund transfers and the sender may have to raise a complaint claiming the amount for the multiple transactions.

In existing methods, the sender has to manually request for reversal of a transaction if the transaction is pending and money is debited from the bank account of the sender. The receiver may decline the sender's request and hence the sender may lose money. Therefore, there is a need to manage pending transactions swiftly.

The information disclosed in this background section is only for enhancement of understanding of the general background of the disclosure and should not be taken as an acknowledgement or any form of suggestion that this information forms the existing art already known to a person skilled in the art.

SUMMARY

Additional features and advantages are realized through the techniques of the present disclosure. Other embodiments and aspects of the disclosure are described in detail herein and are considered a part of the claimed disclosure.

In some non-limiting embodiments or aspects, provided is a computer-implemented method comprising: identifying, by a sender Payment Service Provider (PSP) server, a first transaction from a sender made via the sender PSP server to a receiver via a receiver PSP server, wherein a Real-Time Payment (RTP) server facilitates transactions between the sender PSP server and the receiver PSP server; detecting, by the sender PSP server, at least one subsequent transaction from the sender to the receiver, when the first transaction is pending; comparing, by the sender PSP server, transaction parameters of the at least one subsequent transaction with transaction parameters of the first transaction for determining that the first transaction and the at least one subsequent transaction are associated with a single payment made by the sender to the receiver; identifying, by the sender PSP server, one of the first transaction and the at least one subsequent transaction as successful by monitoring the first transaction and the at least one subsequent transaction; and transmitting, by the sender PSP server, one or more messages based on the monitoring, wherein the one or more messages indicate that one of the first transaction and the at least one subsequent transaction is successful and to discard other transactions among the first transaction and the at least one subsequent transaction, wherein the other transactions are discarded by at least one of the sender PSP server and the receiver PSP server based on the one or more messages.

In some non-limiting embodiments or aspects, the transaction parameters may be at least one of the following: a transaction Identifier (ID), an amount, a currency, a mobile number of the sender and the receiver, a time stamp, a unique identification number of the sender and the receiver, a device fingerprint data of the sender, or any combination thereof.

In some non-limiting embodiments or aspects, the computer-implemented method further comprises assigning a unique pending Identifier (ID) for each of the first transaction and the at least one subsequent transaction, when a status of the respective transaction is updated by the RTP server as pending in a pay response code, wherein the RTP server generates the pay response code in response to receiving a pay request code from the sender PSP server, and wherein the pay response code is generated based on a response provided by the receiver PSP server. In some non-limiting embodiments or aspects, the status of the first transaction and the at least one subsequent transaction is updated as pending in the pay response code when one of: the first transaction and the at least one subsequent transaction is initiated and is being processed; and a response is not received from the receiver PSP server for a respective transaction within a predetermined time. In some non-limiting embodiments or aspects, processing of the first transaction and the at least one subsequent transaction is performed by the sender PSP server simultaneously. In some non-limiting embodiments or aspects, the one or more messages are updated with a void command along with the unique pending ID of the successful transaction, wherein the one or more messages are according to ISO 8583 standard.

In some non-limiting embodiments or aspects, provided is a sender Payment Service Provider (PSP) server comprising: one or more processors, and a memory communicatively coupled to the one or more processors, wherein the memory stores processor-executable instructions, which, on execution, cause the one or more processors to: identify a first transaction from a sender made via the sender PSP server to a receiver via a receiver PSP server, wherein a Real-Time Payment (RTP) server facilitates transactions between the sender PSP server and the receiver PSP server; detect at least one subsequent transaction from the sender to the receiver, when the first transaction is pending; compare transaction parameters of the at least one subsequent transaction with transaction parameters of the first transaction for determining that the first transaction and the at least one subsequent transaction are associated with a single payment made by the sender to the receiver; identify one of the first transaction and the at least one subsequent transaction as successful by monitoring the first transaction and the at least one subsequent transaction; and transmit one or more messages based on the monitoring, wherein the one or more messages indicate that one of the first transaction and the at least one subsequent transaction is successful and to discard other transactions among the first transaction and the at least one subsequent transaction, and wherein the other transactions are discarded by at least one of the sender PSP server and the receiver PSP server based on the one or more messages.

In some non-limiting embodiments or aspects, the sender PSP server further comprises assigning by the one or more processors a unique pending Identifier (ID) for each of the first transaction and the at least one subsequent transaction, when a status of respective transaction is updated by the RTP server as pending in a pay response code, wherein the RTP server generates the pay response code in response to receiving a pay request code from the sender PSP server, and wherein the pay response code is generated based on a response provided by the receiver PSP server. In some non-limiting embodiments or aspects, the one or more processors update the status of the first transaction and the at least one subsequent transaction as pending in the pay response code when one of the first transaction and the at least one subsequent transaction is initiated and is being processed; and a response is not received from the receiver PSP server for a respective transaction within a predetermined time. In some non-limiting embodiments or aspects, the one or more processors process the first transaction and the at least one subsequent transaction simultaneously. In some non-limiting embodiments or aspects, the one or more processors update one or more messages with a void command along with the unique pending ID of the successful transaction, wherein the one or more messages are according to ISO 8583 standard.

In some non-limiting embodiments or aspects, provided is a non-transitory computer-readable medium including instructions stored thereon that when processed by one or more processors cause a sender Payment Service Provider (PSP) server to perform operations comprising: identify a first transaction from a sender made via the sender PSP server to a receiver via a receiver PSP server, wherein a Real-Time Payment (RTP) server facilitates transactions between the sender PSP server and the receiver PSP server; detect at least one subsequent transaction between the sender and the receiver when the first transaction is pending; compare one or more transaction parameters of the at least one subsequent transaction with one or more transaction parameters of the first transaction for determining that the first transaction and the at least one subsequent transaction are associated with a single payment made by the sender to the receiver; identify one of the first transaction and the at least one subsequent transaction as successful by monitoring the first transaction and the at least one subsequent transaction; and transmit one or more messages based on the monitoring, wherein the one or more messages indicate that one of the first transaction and the at least one subsequent transaction is successful and to discard other transactions among the first transaction and the at least one subsequent transaction, and wherein the other transactions is discarded by at least one of the sender PSP server and the receiver PSP server based on the one or more messages.

In some non-limiting embodiments or aspects, the non-transitory computer-readable medium further comprises assigning, by the one or more processors, a unique pending Identifier (ID) for each of the first transaction and the at least one subsequent transaction, when a status of a respective transaction is updated by the RTP server as pending in a pay response code, wherein the RTP server generates the pay response code in response to receiving a pay request code from the sender PSP server, wherein the pay response code is generated based on a response provided by the receiver PSP server. In some non-limiting embodiments or aspects, the one or more processors update the status of the first transaction and the at least one subsequent transaction as pending in the pay response code when one of the first transaction and the at least one subsequent transaction is initiated and is being processed; and a response is not received from the receiver PSP server for a respective transaction within a predetermined time. In some non-limiting embodiments or aspects, the one or more processors process the first transaction and the at least one subsequent transaction simultaneously. In some non-limiting embodiments or aspects, the one or more processors update one or more messages with a void command along with the unique pending ID of the successful transaction, wherein the one or more messages are according to ISO 8583 standard.

In some non-limiting embodiments or aspects, a computer-implemented method to manage pending transactions is provided. The method comprises identifying, by a sender Payment Service Provider (PSP) server, a first transaction from a sender made via the sender PSP server to a receiver via a receiver PSP server. In some non-limiting embodiments or aspects, a Real-Time Payment (RTP) server facilitates transactions between the sender PSP server and the receiver PSP server. Further, the method comprises detecting, by the sender PSP server, at least one subsequent transaction from the sender to the receiver, when the first transaction is pending. Furthermore, the method comprises comparing, by the sender PSP server, transaction parameters of the at least one subsequent transaction with transaction parameters of the first transaction for determining that the first transaction and the at least one subsequent transaction are associated with a single payment made by the sender to the receiver. Moreover, the method comprises identifying, by the sender PSP server, one of the first transaction and the at least one subsequent transaction as successful by monitoring the first transaction and the at least one subsequent transaction. Thereafter, the method comprises transmitting, by the sender PSP server, one or more messages based on the monitoring. In some non-limiting embodiments or aspects, the one or more messages indicate that one of the first transaction and the at least one subsequent transaction is successful and to discard other transactions among the first transaction and the at least one subsequent transaction. The other transactions are discarded by at least one of the sender PSP server and the receiver PSP server based on the one or more messages.

In some non-limiting embodiments or aspects, a sender Payment Service Provider (PSP) server is provided. The sender PSP server is configured to manage pending transactions. The sender PSP server comprises one or more processors and a memory communicatively coupled with the one or more processors. The one or more processors are configured to identify a first transaction from a sender made via the sender PSP server to a receiver via a receiver PSP server. In some non-limiting embodiments or aspects, a Real-Time Payment (RTP) server facilitates transactions between the sender PSP server and the receiver PSP server. Further, the one or more processors are configured to detect at least one subsequent transaction from the sender to the receiver, when the first transaction is pending. Furthermore, the one or more processors are configured to compare transaction parameters of the at least one subsequent transaction with transaction parameters of the first transaction for determining that the first transaction and the at least one subsequent transaction are associated with a single payment made by the sender to the receiver. Moreover, the one or more processors are configured to identify one of the first transaction and the at least one subsequent transaction as successful by monitoring the first transaction and the at least one subsequent transaction. Thereafter, the one or more processors are configured to transmit one or more messages based on the monitoring. In some non-limiting embodiments or aspects, the one or more messages indicate that one of the first transaction and the at least one subsequent transaction is successful and to discard other transactions among the first transaction and the at least one subsequent transaction. The other transactions are discarded by at least one of the sender PSP server and the receiver PSP server based on the one or more messages.

In some non-limiting embodiments or aspects, the present disclosure discloses a non-transitory computer-readable medium including instructions stored thereon that when processed by one or more processors cause a sender Payment Service Provider (PSP) server to manage pending transactions. The one or more processors are configured to identify a first transaction from a sender made via the sender PSP server to a receiver via a receiver PSP server. In some non-limiting embodiments or aspects, a Real-Time Payment (RTP) server facilitates transactions between the sender PSP server and the receiver PSP server. Further, the one or more processors are configured to detect at least one subsequent transaction from the sender to the receiver, when the first transaction is pending. Furthermore, the one or more processors are configured to compare transaction parameters of the at least one subsequent transaction with transaction parameters of the first transaction for determining that the first transaction and the at least one subsequent transaction are associated with a single payment made by the sender to the receiver. Moreover, the one or more processors are configured to identify one of the first transaction and the at least one subsequent transaction as successful by monitoring the first transaction and the at least one subsequent transaction. Thereafter, the one or more processors are configured to transmit one or more messages based on the monitoring. In some non-limiting embodiments or aspects, the one or more messages indicate that one of the first transaction and the at least one subsequent transaction is successful and to discard other transactions among the first transaction and the at least one subsequent transaction. The other transactions are discarded by at least one of the sender PSP server and the receiver PSP server based on the one or more messages.

Further non-limiting embodiments or aspects are set forth in the following numbered clauses.

Clause 1: A computer-implemented method comprising: identifying, by a sender Payment Service Provider (PSP) server, a first transaction from a sender made via the sender PSP server to a receiver via a receiver PSP server, wherein a Real-Time Payment (RTP) server facilitates transactions between the sender PSP server and the receiver PSP server; detecting, by the sender PSP server, at least one subsequent transaction from the sender to the receiver, when the first transaction is pending; comparing, by the sender PSP server, transaction parameters of the at least one subsequent transaction with transaction parameters of the first transaction for determining that the first transaction and the at least one subsequent transaction are associated with a single payment made by the sender to the receiver; identifying, by the sender PSP server, one of the first transaction and the at least one subsequent transaction as successful by monitoring the first transaction and the at least one subsequent transaction; and transmitting, by the sender PSP server, one or more messages based on the monitoring, wherein the one or more messages indicates that one of the first transaction and the at least one subsequent transaction is successful and to discard other transactions among the first transaction and the at least one subsequent transaction, wherein the other transactions are discarded by at least one of the sender PSP server and the receiver PSP server based on the one or more messages.

Clause 2: The computer-implemented method of clause 1, wherein the transaction parameters may be at least one of the following: a transaction Identifier (ID), an amount, a currency, a mobile number of the sender and the receiver, a time stamp, a unique identification number of the sender and the receiver, a device fingerprint data of the sender, or any combination thereof.

Clause 3: The computer-implemented method of clause 1 or 2, further comprising assigning a unique pending Identifier (ID) for each of the first transaction and the at least one subsequent transaction, when a status of the respective transaction is updated by the RTP server as pending in a pay response code, wherein the RTP server generates the pay response code in response to receiving a pay request code from the sender PSP server, and wherein the pay response code is generated based on a response provided by the receiver PSP server.

Clause 4: The computer-implemented method of any of clauses 1-3, wherein the status of the first transaction and the at least one subsequent transaction is updated as pending in the pay response code when one of: the first transaction and the at least one subsequent transaction is initiated and is being processed; and a response is not received from the receiver PSP server for a respective transaction within a predetermined time.

Clause 5: The computer-implemented method of any of clauses 1-4, wherein processing of the first transaction and the at least one subsequent transaction is performed by the sender PSP server simultaneously.

Clause 6: The computer-implemented method of any of clauses 1-5, wherein the one or more messages are updated with a void command along with the unique pending ID of the successful transaction, wherein the one or more messages are according to ISO 8583 standard.

Clause 7: A sender Payment Service Provider (PSP) server comprising: one or more processors, and a memory communicatively coupled to the one or more processors, wherein the memory stores processor-executable instructions, which, on execution, cause the one or more processors to: identify a first transaction from a sender made via the sender PSP server to a receiver via a receiver PSP server, wherein a Real-Time Payment (RTP) server facilitates transactions between the sender PSP server and the receiver PSP server; detect at least one subsequent transaction from the sender to the receiver, when the first transaction is pending; compare transaction parameters of the at least one subsequent transaction with transaction parameters of the first transaction for determining that the first transaction and the at least one subsequent transaction are associated with a single payment made by the sender to the receiver; identify one of the first transaction and the at least one subsequent transaction as successful by monitoring the first transaction and the at least one subsequent transaction; and transmit one or more messages based on the monitoring, wherein the one or more messages indicate that one of the first transaction and the at least one subsequent transaction is successful and to discard other transactions among the first transaction and the at least one subsequent transaction, wherein the other transactions are discarded by at least one of the sender PSP server and the receiver PSP server based on the one or more messages.

Clause 8: The sender PSP server of clause 7, further comprising assigning by the one or more processors a unique pending Identifier (ID) for each of the first transaction and the at least one subsequent transaction, when a status of a respective transaction is updated by the RTP server as pending in a pay response code, wherein the RTP server generates the pay response code in response to receiving a pay request code from the sender PSP server, wherein the pay response code is generated based on a response provided by the receiver PSP server.

Clause 9: The sender PSP server of clause 7 or 8, wherein the one or more processors update the status of the first transaction and the at least one subsequent transaction as pending in the pay response code when one of: the first transaction and the at least one subsequent transaction is initiated and is being processed; and a response is not received from the receiver PSP server for the respective transaction within a predetermined time.

Clause 10: The sender PSP server of any of clauses 7-9, wherein the one or more processors processes the first transaction and the at least one subsequent transaction simultaneously.

Clause 11: The sender PSP server of any of clauses 7-10, wherein the one or more processors update one or more messages with a void command along with the unique pending ID of the successful transaction, wherein the one or more messages are according to ISO 8583 standard.

Clause 12: A non-transitory computer-readable medium including instructions stored thereon that when processed by one or more processors cause a sender Payment Service Provider (PSP) server to perform operations comprising: identifying a first transaction from a sender made via the sender PSP server to a receiver via a receiver PSP server, wherein a Real-Time Payment (RTP) server facilitates transactions between the sender PSP server and the receiver PSP server; detecting at least one subsequent transaction between the sender and the receiver, when the first transaction is pending; comparing one or more transaction parameters of the at least one subsequent transaction with one or more transaction parameters of the first transaction for determining that the first transaction and the at least one subsequent transaction are associated with a single payment made by the sender to the receiver; identifying one of the first transaction and the at least one subsequent transaction as successful by monitoring the first transaction and the at least one subsequent transaction; and transmitting one or more messages based on the monitoring, wherein the one or more messages indicate that one of the first transaction and the at least one subsequent transaction is successful and to discard other transactions among the first transaction and the at least one subsequent transaction, wherein the other transactions are discarded by at least one of the sender PSP server and the receiver PSP server based on the one or more messages.

Clause 13: The non-transitory computer-readable medium of clause 12 further comprising assigning, by the one or more processors, a unique pending Identifier (ID) for each of the first transaction and the at least one subsequent transaction, when a status of a respective transaction is updated by the RTP server as pending in a pay response code, wherein the RTP server generates the pay response code in response to receiving a pay request code from the sender PSP server, wherein the pay response code is generated based on a response provided by the receiver PSP server.

Clause 14: The non-transitory computer-readable medium of clause 12 or 13, wherein the one or more processors update the status of the first transaction and the at least one subsequent transaction as pending in the pay response code when one of: the first transaction and the at least one subsequent transaction is initiated and is being processed; and a response is not received from the receiver PSP server for the respective transaction within a predetermined time.

Clause 15: The non-transitory computer-readable medium of any of clauses 12-14, wherein the one or more processors process the first transaction and the at least one subsequent transaction simultaneously.

Clause 16: The non-transitory computer-readable medium of any of clauses 12-15, wherein the one or more processors update one or more messages with a void command along with the unique pending ID of the successful transaction, wherein the one or more messages are according to ISO 8583 standard.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The novel features and characteristic of the disclosure are set forth in the appended claims. The disclosure itself, however, as well as a preferred mode of use, further objectives, and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more non-limiting embodiments are now described, by way of example only, with reference to the accompanying figures, wherein like reference numerals represent like elements and in which:

FIG. 4A is an exemplary table that includes an International Organization for Standardization (ISO) message format, in accordance with some non-limiting embodiments or aspects of the present disclosure;

FIGS. 4B-4E are exemplary tables that include data fields related to first, second, third, and fourth positions of a Message Type Indicator (MTI) identifier, in accordance with some non-limiting embodiments or aspects of the present disclosure;

Figure 1:
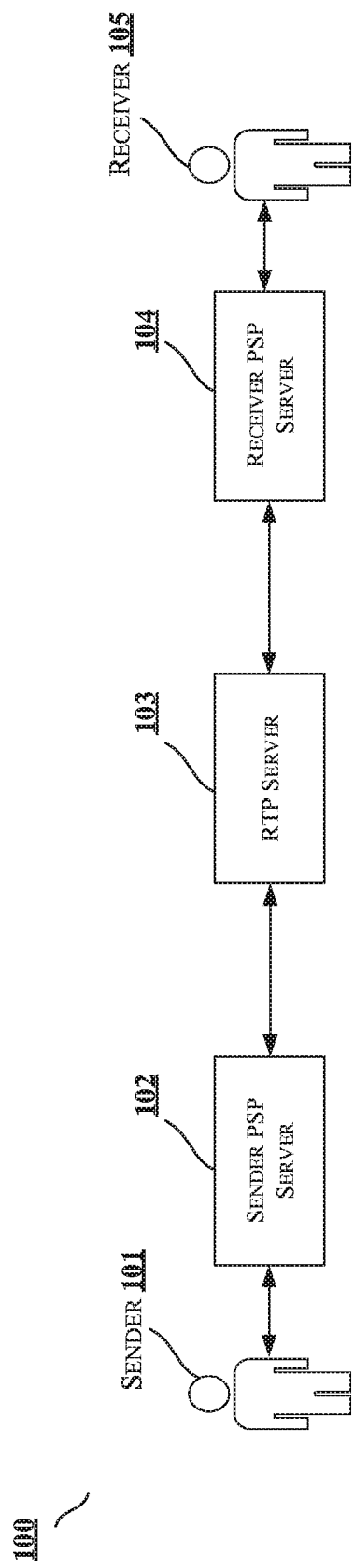
FIG. 1 is an exemplary platform for performing Person-to-Person (P2P) real-time transactions, in accordance with some non-limiting embodiments or aspects of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer-readable medium and executed by a computer or processor, whether or not such computer or processor is explicitly shown. While each of the figures illustrates a particular embodiment for purposes of illustrating a clear example, other embodiments may omit, add to, reorder, and/or modify any of the elements shown in the figures.

DETAILED DESCRIPTION

In the present document, the term "exemplary" is used herein to mean "serving as an example, instance, or illustration." Any embodiment or implementation of the present subject matter described herein as "exemplary" is not necessarily to be construed as preferred or advantageous over other embodiments.

In the following detailed description of the embodiments of the disclosure, reference is made to the accompanying drawings that form a part hereof, and in which are shown by way of illustration specific embodiments in which the disclosure may be practiced. It should be understood, however, that it is not intended to limit the disclosure to the forms disclosed, but on the contrary, the disclosure is to cover all modifications, equivalents, and alternatives falling within the spirit and the scope of the disclosure. It is to be understood that other embodiments may be utilized and that changes may be made without departing from the scope of the present disclosure. The following description is, therefore, not to be taken in a limiting sense.

The terms "comprises", "comprising", or any other variations thereof are intended to cover a non-exclusive inclusion, such that a setup, device, or method that comprises a list of components or steps does not include only those components or steps but may include other components or steps not expressly listed or inherent to such setup, device, or method. In other words, one or more elements in a system or apparatus proceeded by "comprises . . . a" does not, without more constraints, preclude the existence of other elements or additional elements in the system or method.

The terms "includes", "including", or any other variations thereof are intended to cover a non-exclusive inclusion such that a setup, device, or method that includes a list of components or steps does not include only those components or steps but may include other components or steps not expressly listed or inherent to such setup, device, or method. In other words, one or more elements in a system or apparatus proceeded by "includes . . . a" does not, without more constraints, preclude the existence of other elements or additional elements in the system or method.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has", "have", "having", or the like are intended to be open-ended terms. Further, the phrase "based on" is intended to mean "based at least in partially on" unless explicitly stated otherwise. The term "some non-limiting embodiments or aspects" means "one or more (but not all) embodiments or aspects of the disclosure(s)" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

As used herein, the terms "communication", "communicate", "send", and/or "receive" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "server" and/or "processor" may refer to one or more computing devices or computing units, such as processors, storage devices, and/or similar computer components, that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices such as, but not limited to, processors, servers, client devices, software applications, and/or other like components. In addition, reference to "a server" or "a processor", as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments of the present disclosure relate to a method, a sender Payment Service Provider (PSP) server, and a non-transitory computer-readable medium to manage pending transactions. A first transaction from a sender made via the sender PSP server to a receiver via a receiver PSP server is identified. A Real-Time Payment (RTP) server facilitates transactions between the sender PSP server and the receiver PSP server. When the first transaction is pending, at least one subsequent transaction from the sender to the receiver is detected. Transaction parameters of the at least one subsequent transaction is compared with transaction parameters of the first transaction for determining that the first transaction and the at least one subsequent transaction are associated with a single payment made by the sender to the receiver. One of the first transaction and the at least one subsequent transaction is identified as successful by monitoring the first transaction and the at least one subsequent transaction. One or more messages are transmitted to the sender PSP server and the receiver PSP server based on the monitoring. The one or more messages indicate that one of the first transaction and the at least one subsequent transaction is successful and to discard other transactions among the first transaction and the at least one subsequent transaction. The other transactions are discarded by at least one of the sender PSP server and the receiver PSP server based on the one or more messages.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 represents a non-limiting embodiment or aspect of a platform (100) for performing Person-to-Person (P2P) real-time transactions in accordance with the present disclosure. The platform (100) is provided as a service to a sender (101) and a receiver (105) to enable users (senders and receivers) to perform transactions. A non-limiting implementation of the platform (100) relating to online payment transactions is described. The present disclosure pertains to real-time P2P transactions. The present disclosure relates to online transactions made using a P2P payment application.

In some non-limiting embodiments or aspects, the platform (100) comprises a sender PSP server (102), an RTP server (103), and a receiver PSP server (104). The sender (101) may be a first person transferring funds from a first bank account associated with the first person to a second person associated with a second bank account. A PSP is an entity which provides payment services to the users. The sender PSP server (102) is an entity associated with the sender (101) that provides payment services to the sender (101) for transmitting an amount. The sender PSP server (102) may be associated with a bank of the sender (101). The sender PSP server (102) is a back-end service associated with the bank of the sender (101). A sender PSP application (not shown in the figures) provides front-end service for the sender (101). The RTP server (103) allows transfer of funds between the sender (101) and the receiver (105) via the sender PSP server (102) and the receiver PSP server (104), respectively. For example, the RTP server (103) may be a Unified Payment Interface (UPI) server.

In some non-limiting embodiments or aspects, the RTP server (103) may implement any type of instant payment service. In some non-limiting embodiments or aspects, the funds can be transferred using a Virtual Payment Address (VPA). The RTP server (103) eliminates the need to enter bank details or other sensitive information each time a user initiates a transaction. The receiver PSP server (104) may be associated with a bank of the receiver (105). The receiver PSP server (104) is a back-end service associated with the bank of the receiver (105). A receiver PSP application (not shown in the figures) provides front-end service for the receiver (105). The sender PSP application and the receiver PSP application uses the RTP libraries for facilitating payments. The receiver (105) may be a person receiving funds from the sender (101).

In some non-limiting embodiments or aspects, when a fund transfer is automated, the sender (101) and the receiver (105) may be two different systems. In some non-limiting embodiments or aspects, the sender PSP server (102) and the receiver PSP server (104) may be payment gateways connected to a plurality of bank entities, facilitating ease of transactions for the users (the sender (101) and the receiver (105)).

The RTP server (103) facilitates two types of transactions, namely, a pay request and a collect request. The pay request (and/or pay request code) is a transaction where the sender (101) is pushing funds to the receiver (105) using an account number, a mobile number, an Aadhaar™ number, the VPA, and the like. The collect request is a transaction where the receiver (105) is pulling funds from the sender (101) by using the VPA. The present disclosure is explained with reference to the pay request (and/or pay request code). However, the present disclosure is not limited to the pay request (and/or pay request code) alone and a person skilled in the art will appreciate the working of pay collect as well.

Figure 2:
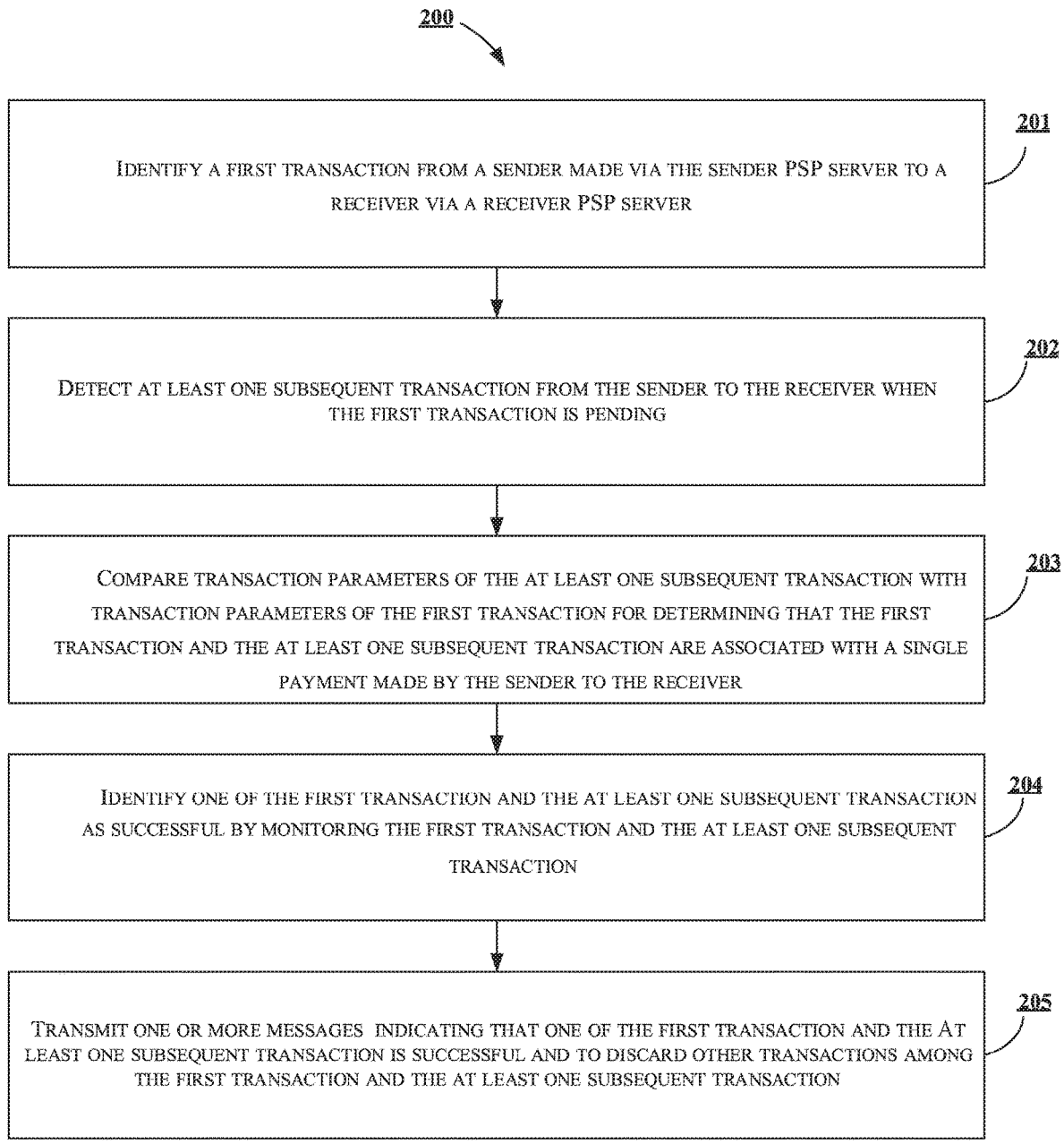
FIG. 2 is an exemplary flowchart for managing pending transactions, in accordance with some non-limiting embodiments or aspects of the present disclosure.

FIG. 2 is a flow chart illustrating a method (200) to manage the pending transactions, in accordance with some non-limiting embodiments or aspects of the present disclosure. As illustrated in FIG. 2, the method (200) may comprise one or more steps. The method (200) may be described in the general context of computer executable instructions. Generally, computer executable instructions can include routines, programs, objects, components, data structures, procedures, modules, and functions which perform particular functions or implement particular abstract data types.

The order in which the method (200) is described is not intended to be construed as a limitation, and any number of the described method blocks can be combined in any order to implement the method. Additionally, individual blocks may be deleted from the methods without departing from the spirit and scope of the subject matter described herein.

Furthermore, the method can be implemented in any suitable hardware, software, firmware, or combination thereof.

Figure 3:
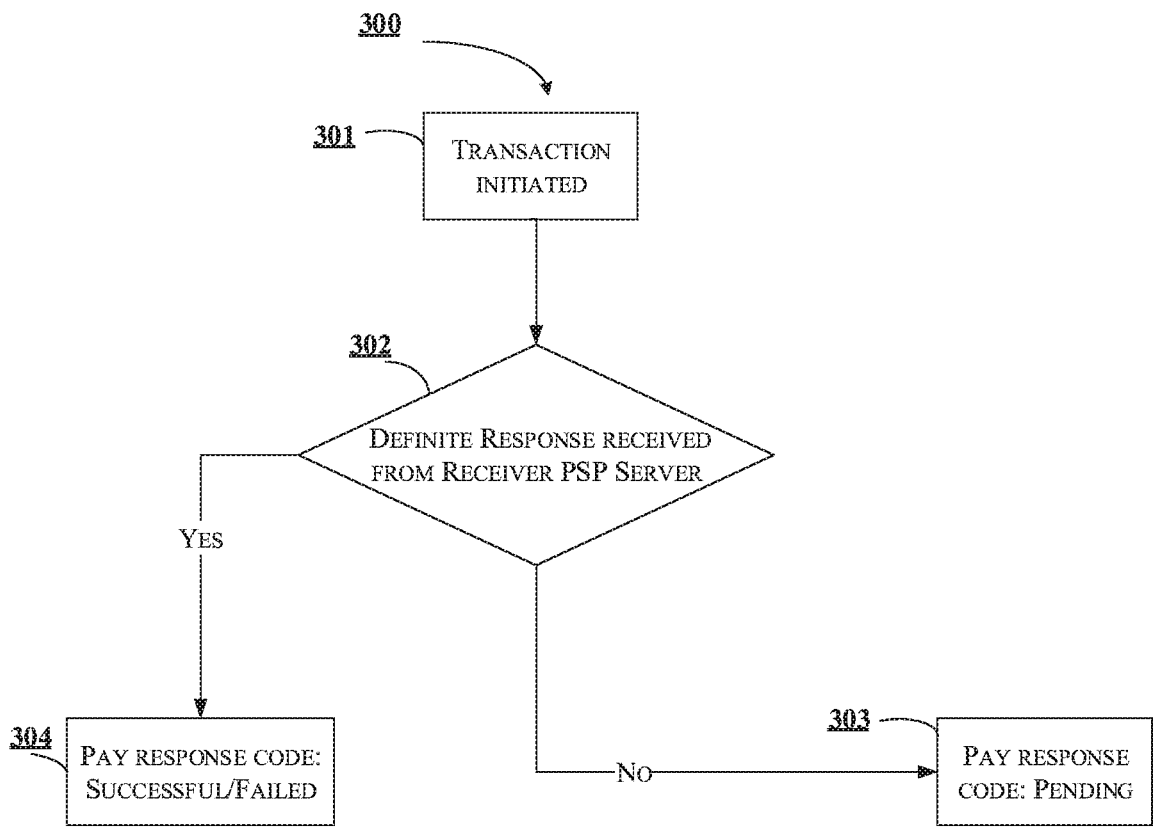
FIG. 3 is an exemplary flowchart for determining a status of a transaction as pending, in accordance with some non-limiting embodiments or aspects of the present disclosure.

The method at step (201), includes identifying, by the sender PSP server (102), a first transaction from the sender (101) made via the sender PSP server (102) to the receiver (105) via the receiver PSP server (104) where the RTP server (103) facilitates transactions between the sender PSP server (102) and the receiver PSP server (104). The sender PSP server (102) may identify the first transaction from the sender (101) to the receiver (105). The first transaction may be associated with a transaction ID, an amount, a currency, a mobile number of the sender (101) and the receiver (105), a time stamp, a unique identification number of the sender (101) and the receiver (105), a device fingerprint data of the sender (101), or any combination thereof. The first transaction may have a status successful, pending, or failed. In some non-limiting embodiments or aspects, the RTP server (103) may send an indication message to the sender PSP server (102) indicating that a transaction is successful, pending, or has failed. In some non-limiting embodiments or aspects, a unique pending ID is assigned to the first transaction, if the status of the first transaction is pending. Reference is now made to FIG. 3, illustrating an exemplary flowchart (300) for determining a status of a transaction as pending. At block (301), a transaction is initiated by the sender PSP server (102) when the sender (101) enters the required details such as transaction amount, recipient details, password, etc.). At block (302), the RTP server (103) determines if a definite response of the transaction is received from the receiver PSP server (104).

The RTP server (103) may determine a status of the transaction based on the response from the receiver PSP server (104). The status of the transaction may be one of successful, failed, or pending. In some non-limiting embodiments or aspects, the successful and failed statuses may be definite statuses, whereas the status like timed-out, server not reached, transaction pending, and connection lost may be indefinite statuses. The RTP server (103) updates the pay response code as successful or failed at block (304) when the status is definite. Even if the response is received from the receiver PSP server (104), the status of the transaction may be failed due to various reasons like Internet connectivity, wrong entry of data, and the like. The RTP server (103) waits for the response for a predetermined time.

At block (303), if a response is not received within a predetermined time or after a timeout, or if the status of the transaction is indefinite at block (304), the RTP server (103) may update the status of the transaction as pending in the pay response code. Referring back to FIG. 2, the RTP server (103) may update the status of the first transaction in the pay response code. In a first example (not shown in the figures), the sender (101) may be a customer and the receiver (105) may be a merchant. The first transaction may involve transferring of funds from the customer to the merchant. The customer may transfer an amount of 300 USD to the merchant. The first transaction may be pending due to Internet connectivity. The unique pending ID may be XXXP.

The method at step (202) includes detecting, by the sender PSP server (102), at least one subsequent transaction from the sender (101) to the receiver (105), when the first transaction is pending. The sender PSP server (102) may detect at least one subsequent transaction from the sender (101) to the receiver (105). In the present disclosure, at least one subsequent transaction from the sender (101) to the receiver (105) refers to transactions made from the sender (101) to the receiver (105) when the first transaction from the sender (101) to the receiver (105) is pending. Referring to the first example, since the status of the first transaction is pending because of the Internet connectivity, the user may make the subsequent transaction with the same amount of 300 USD to the merchant.

The method at step (203) includes comparing, by the sender PSP server (102), transaction parameters of the at least one subsequent transaction with transaction parameters of the first transaction for determining that the first transaction and the at least one subsequent transaction are associated with a single payment made by the sender (101) to the receiver (105). The transaction parameters may be at least one of a transaction ID, an amount, a currency, a mobile number of the sender (101) and the receiver (105), a time stamp, a unique identification number of the sender (101) and the receiver (105), a device fingerprint data of the sender (101), or any combination thereof. The sender PSP server (102) may compare the transaction parameters of the first transaction and the at least one subsequent transaction to determine if both transactions are associated with the single payment made from the sender (101) to the receiver (105).

Referring to the first example, the transaction parameters of the first transaction may be a transaction ID: XXX0, an amount: 300, a currency: INR, mobile number of the user: 99XXXXXX01, mobile number of the merchant: 99XXXXXX11, a time stamp: 10.00 AM, a unique ID of the user: XXXXXXXXXXX1, a unique ID of the merchant: XXXXXXXXXXX2, a 4-digit Personal Identification Number (PIN): XXX3 of the mobile associated with the user. The transaction parameters of the subsequent transaction may be a transaction ID: XXX1, an amount: 300, a currency: INR, mobile number of the user: 99XXXXXX01, mobile number of the merchant: 99XXXXXX11, a time stamp: 10.02 AM, a unique ID of the user: XXXXXXXXXXX1, a unique ID of the merchant: XXXXXXXXXXX2, a 4-digit Personal Identification Number (PIN): XXX3 of the mobile associated with the user. The transaction ID and the timestamp varies, whereas the other transaction parameters for the transactions associated with the single payment from the user to the merchant remain the same. The sender PSP server (102) compares the transaction parameters of the first transaction and the subsequent transaction to determine that both transactions are associated with the single payment made from the user to the merchant. The sender PSP server (102) may assign the unique pending ID XXXP to the subsequent transaction as well to identify that the first transaction and the subsequent transaction are associated with the single payment made from the user to the merchant. In another embodiment, the sender PSP server (102) may group the pending transactions associated with the single payment by assigning the unique pending IDs as 10.1, 10.2 . . . 10.n, 10 indicating the single payment from the user to the merchant. In another embodiment, all the transaction IDs associated with the single payment may be stored in a tuple. A person skilled in the art should appreciate that any other methods to group and identify the transactions associated with the single payment may be used, and the scope of the present disclosure is not limited to the above discussed methods.

The method at step (204) includes identifying, by the sender PSP server (102), one of the first transaction and the at least one subsequent transaction as successful by monitoring the first transaction and the at least one subsequent transaction. In some non-limiting embodiments or aspects, the first transaction and the at least one subsequent transaction may be processed simultaneously by the sender PSP server (102). The RTP server (103) updates the pay response code based on the response from the receiver PSP server (104). The pay response code provides the status of the transaction as successful, pending, or failed. When the response received from the receiver PSP server (104) is a successful transaction, the RTP server (103) updates the pay response code as successful and sends the indication message as successful to the sender PSP server (102). The sender PSP server (102) may determine the unique pending ID associated with the transaction based on the transaction ID of the transaction.

In some non-limiting embodiments or aspects, the indication message may be according to International Organization for Standardization (ISO) 8583 standard. Referring to the first example, the first transaction from the user to the merchant may be successful or the subsequent transaction from the user to the merchant may be successful. The RTP server (103) may update a pay response code of the first transaction or the subsequent transaction as successful based on the response from the receiver PSP server (104) and notify the same to the sender PSP server (102).

The method at step (205) includes transmitting, by the sender PSP server (102), one or more messages based on the monitoring. The one or more messages indicate that one of the first transaction and the at least one subsequent transaction is successful and to discard other transactions among the first transaction and the at least one subsequent transaction. The other transactions are discarded by at least one of the sender PSP server (102) and the receiver PSP server (104) based on the one or more messages. Once the first transaction or the at least one of the subsequent transactions is successful, the sender PSP server (102) may determine the unique pending ID associated with the transaction based on the transaction ID of the transaction as mentioned in the above paragraph. In some non-limiting embodiments or aspects, when one of the first or the at least one subsequent transactions is successful, the one or more messages are updated with a void command along with the unique pending ID of the successful transaction.

The sender PSP server (102) transmits the one or more messages to indicate the successful transaction and to discard all the other transactions. The other transactions are discarded either by the sender PSP server (102) or the receiver PSP server (104) based on the one or more messages. In some non-limiting embodiments or aspects, when the sender PSP server (102) discards the other transactions, the sender PSP server (102) sends a discard message to the receiver PSP server (104) notifying that the processing of the single payment associated with the sender (101) and the receiver (105) is concluded, and vice versa.

In some non-limiting embodiments or aspects, the transactions associated with the single payment from the sender (101) to the receiver (105) are assigned with same pending IDs. The sender PSP server (102) or the receiver PSP server (104) discards all the transactions from the sender (101) to the receiver (105) except the successful transaction. When the pending ID is same for all of the transactions associated with the single payment, the sender PSP server (102) or the receiver PSP server (104) may discard the successful transaction based on the transaction ID of the successful transaction. In another embodiment, when the assigned pending ID is different for each pending transaction, the sender PSP server (102) or the receiver PSP server (104) may discard the successful transaction based on the pending ID of the successful transaction.

In some non-limiting embodiments or aspects, the one or more messages are according to the ISO 8583 standard. The ISO 8583 defines the transaction message structure for performing transactions. Referring to the first example, the first transaction with the transaction ID XXX0 from the user to the merchant may be successful in a certain time after the subsequent transaction is made and the sender PSP server (102) or the receiver PSP server (104) may discard the subsequent transaction. The subsequent transaction is discarded so that if the subsequent transaction becomes successful after a certain time, the user might lose money.

Reference is now made to FIG. 4A showing an example of the ISO 8583 message format. As shown in FIG. 4A, the one or more messages generated according to ISO 8583 may comprise a Message Type Identifier (MTI), a primary bitmap, a secondary bitmap, and data elements. The MTI is a four-digit numeric field that describes each message class and function. There are few versions of the ISO 8583 standard, they are: ISO 8583: 1987, ISO 8583: 1993, and ISO 8583: 2003. The first digit among the four-digit represents the version of the ISO 8583. The first digit indicating the version of the ISO standard is illustrated in FIG. 4B. As shown, when the first digit of the four-digit is 0, the version is ISO 8583: 1987. Likewise, when the first digit of the four-digit is 1, the version is ISO 8583: 1993 and when the first digit of the four-digit is 2, the version is ISO 8583: 2003.

FIG. 4C illustrates the fields associated with the second digit of the MTI. As shown, the second digit can take the values 0 to 9. As can be seen in FIG. 4C, for the values 0 and 9, the MTI field is reserved for ISO. Likewise, FIG. 4D illustrates the fields associated with the third digit of the MTI. As can be seen in FIG. 4D, for the values 8 and 9, the MTI field is reserved for ISO.

In some non-limiting embodiments or aspects, the sender PSP server (102) may include the void command along with the unique pending ID of the successful transaction in the one or more messages indicating the successful transaction. In some non-limiting embodiments or aspects, the second digit among the four digits can indicate the successful transaction in the one or more messages. For example, the value 0 in the second digit can be defined to indicate the successful transaction. In another example, the value 9 in the second digit can be defined to indicate the successful transaction. A person of ordinary skills in the art will appreciate that the command indicating the success of a transaction among a plurality of pending transactions may be indicated using various commands and in various fields of the ISO 8583 message format.

In some non-limiting embodiments or aspects, the third digit among the four digits can indicate the successful transaction in the one or more messages. For example, the value 8 in the third digit can be defined to indicate the successful transaction. In another example, the value 9 in the third digit can be defined to indicate the successful transaction. In some non-limiting embodiments or aspects, for all values of the fourth digit, the field is defined. Hence, the successful transaction may not be identified using the fourth digit. FIG. 4E illustrates the fields associated with fourth digit of the MTI.

In some non-limiting embodiments or aspects, a bitmap is a field indicating which data elements may be present or not present in the transaction message. The transaction message includes at least one bitmap, called the primary bitmap, which indicates which of data elements 1 to 64 are present. A secondary bitmap may also be present, and the secondary bitmap indicates which of data elements 65 to 128 are present. Also, a third bitmap can be used to indicate the presence or absence of fields 129 to 192. In some non-limiting embodiments or aspects, the void command along with the unique pending ID of the successful transaction can be accommodated either in the first 1 to 64 bits of the data elements or the 65 to 128 bits of the data elements. Accordingly, the primary bitmap and secondary bitmap can be updated to indicate a void command along with the unique pending ID of the successful transaction in the one or more messages. The value of the bitmap indicates whether the void command along with the unique pending ID of the successful transaction is present in the 1 to 64 bits or 65 to 128 bits.

In some non-limiting embodiments or aspects, the data elements are all the fields that include the transaction information. ISO 8583:1997 includes up to 128 data elements (where the message will have up to 2 bitmap fields). The later versions include up to 192 data elements (where the message will have up to 3 bitmap fields). Each field (data element) has a specific meaning and format. In some non-limiting embodiments or aspects, the data elements can also include the void command along with the unique pending ID of the successful transaction. For example, the data fields 46, 47, 48, 55-63, 105-119 can be used. In another embodiment, the field 128 is used for message authentication code in conventional systems. In accordance with the present disclosure, the field 128 can be used for a void command along with the unique pending ID of the successful transaction.

Figure 5:
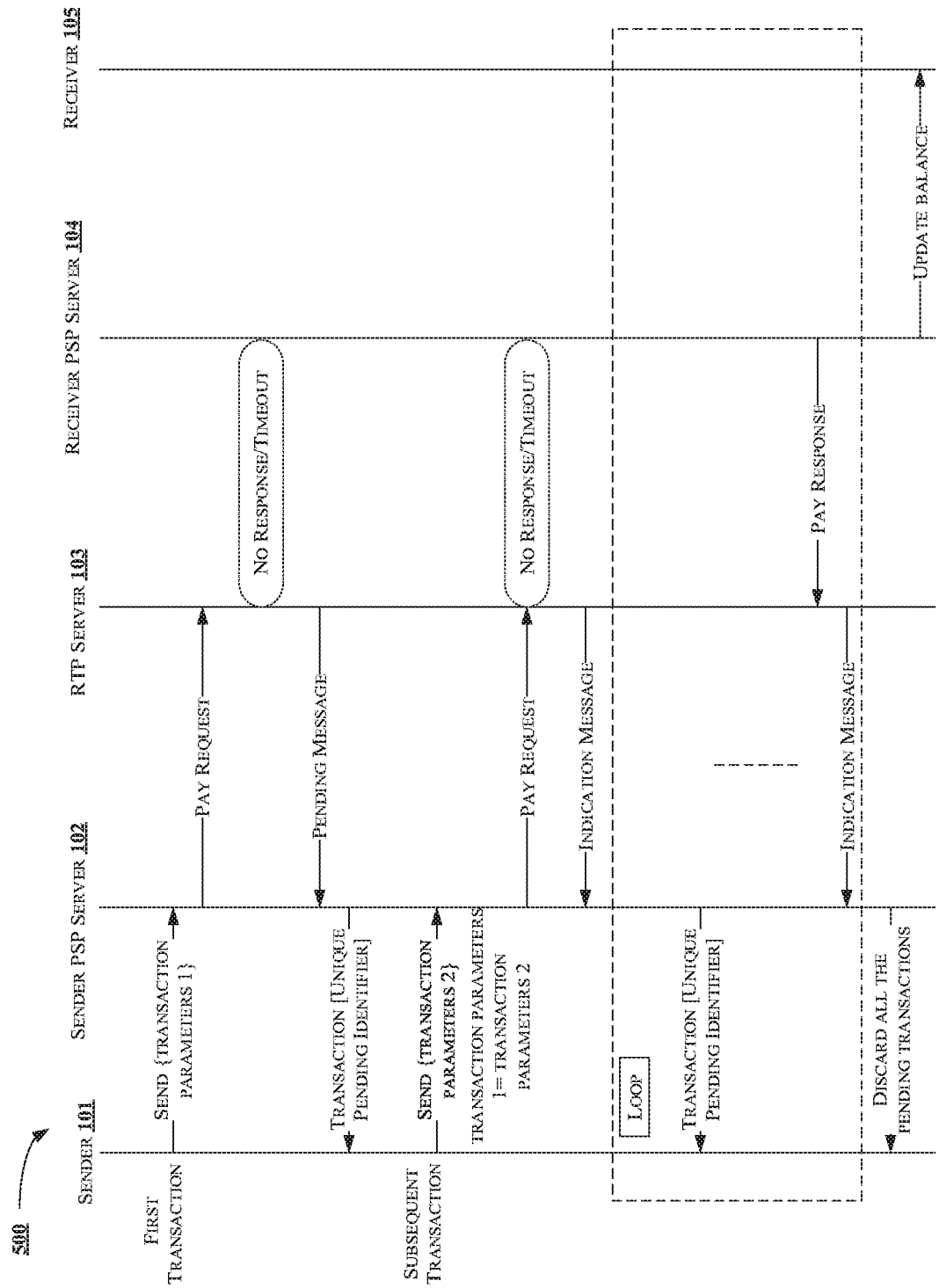
FIG. 5 is an exemplary sequence diagram for managing pending transactions, in accordance with some non-limiting embodiments or aspects of the present disclosure.

Reference is now made to FIG. 5, which illustrates an exemplary sequence diagram (500) for managing pending transactions. For example, the sender (101) makes the first transaction via the sender PSP server (102) to the receiver (105) via the receiver PSP server (104) facilitated by the RTP server (103). The sender PSP server (102) sends a pay request (and/or pay request code) along with the transaction parameters to the receiver PSP server (104) via the RTP server (103). The first transaction is processed and the RTP server (103) awaits a pay response of the first transaction from the receiver PSP server (104). If a response is not received, the RTP server (103) updates the status of the first transaction as pending in the pay response code after the timeout (predefined time period). The RTP server (103) sends the indication message as pending to the sender PSP server (102). The sender PSP server (102) assigns a unique pending ID to the first transaction. Since the first transaction is pending, the sender (101) may make the subsequent transaction to the receiver (105).

The sender PSP server (102) sends the pay request (and/or pay request code) along with the transaction parameters to the receiver PSP server (104) via the RTP server (103). The sender PSP server (102) compares the transaction parameters of the first transaction with the transaction parameters of the subsequent transaction. The sender PSP server (102) determines that the first transaction and the subsequent transactions are associated with the single payment made from the sender (101) to the receiver (105). When the subsequent transaction is processed, the RTP server (103) awaits the pay response of the subsequent transaction from the receiver PSP server (104). If there is no response for the subsequent transaction within the predefined time period, the RTP server (103) updates the status of the subsequent transaction as pending in the pay response code after the timeout. The RTP server (103) sends the indication message as pending to the sender PSP server (102). The sender PSP server (102) assigns a unique pending ID to the subsequent transaction.

A plurality of transactions may be made by the sender (101) when the first transaction is pending. The transactions associated with the single payment are in a loop until a transaction is successful. The sender PSP server (102) simultaneously monitors the multiple transactions to identify a successful transaction. The sender PSP server (102) transmits one or more messages when one transaction among the multiple transactions is successful. A transaction may be successful when the response is received from the receiver PSP server (104). The sender PSP server (102) or the receiver PSP server (104) discards all the other transactions upon the transaction being successful. The balance of the sender (101) is updated.

Figure 6A:
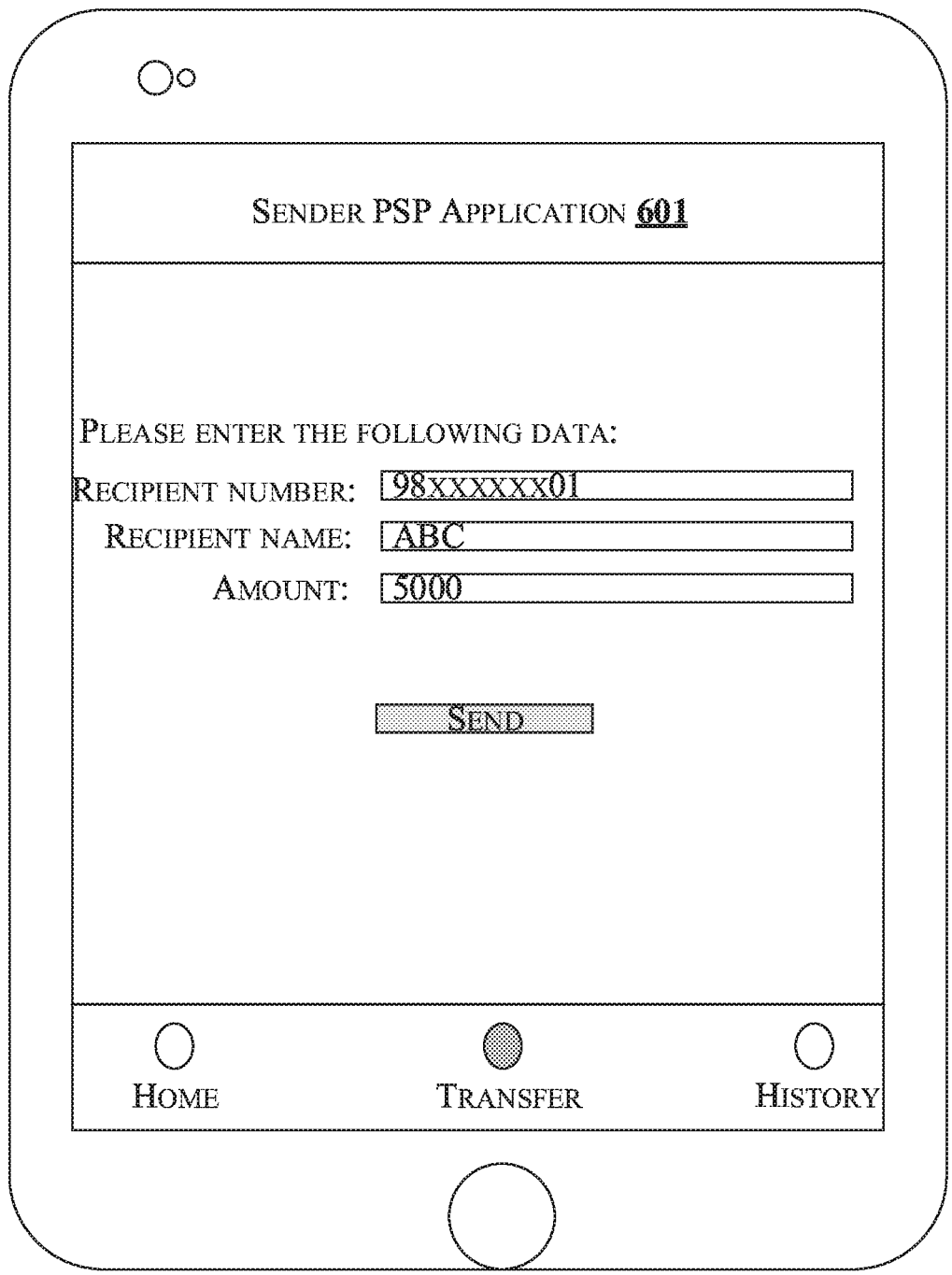
FIGS. 6A-6D are exemplary sender PSP applications, in accordance with some non-limiting embodiments or aspects of the present disclosure.
Figure 6B:
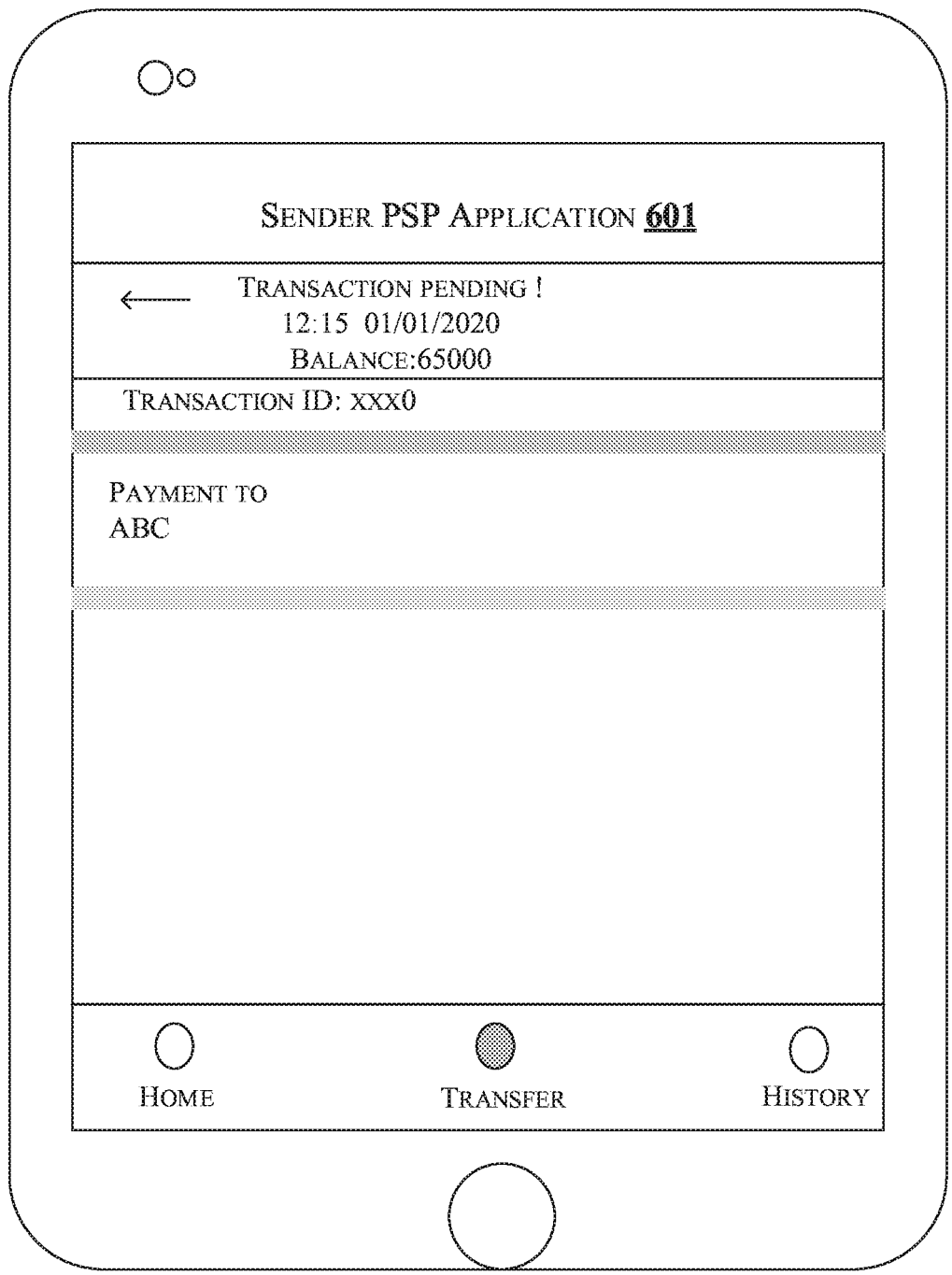
Figure 6C:
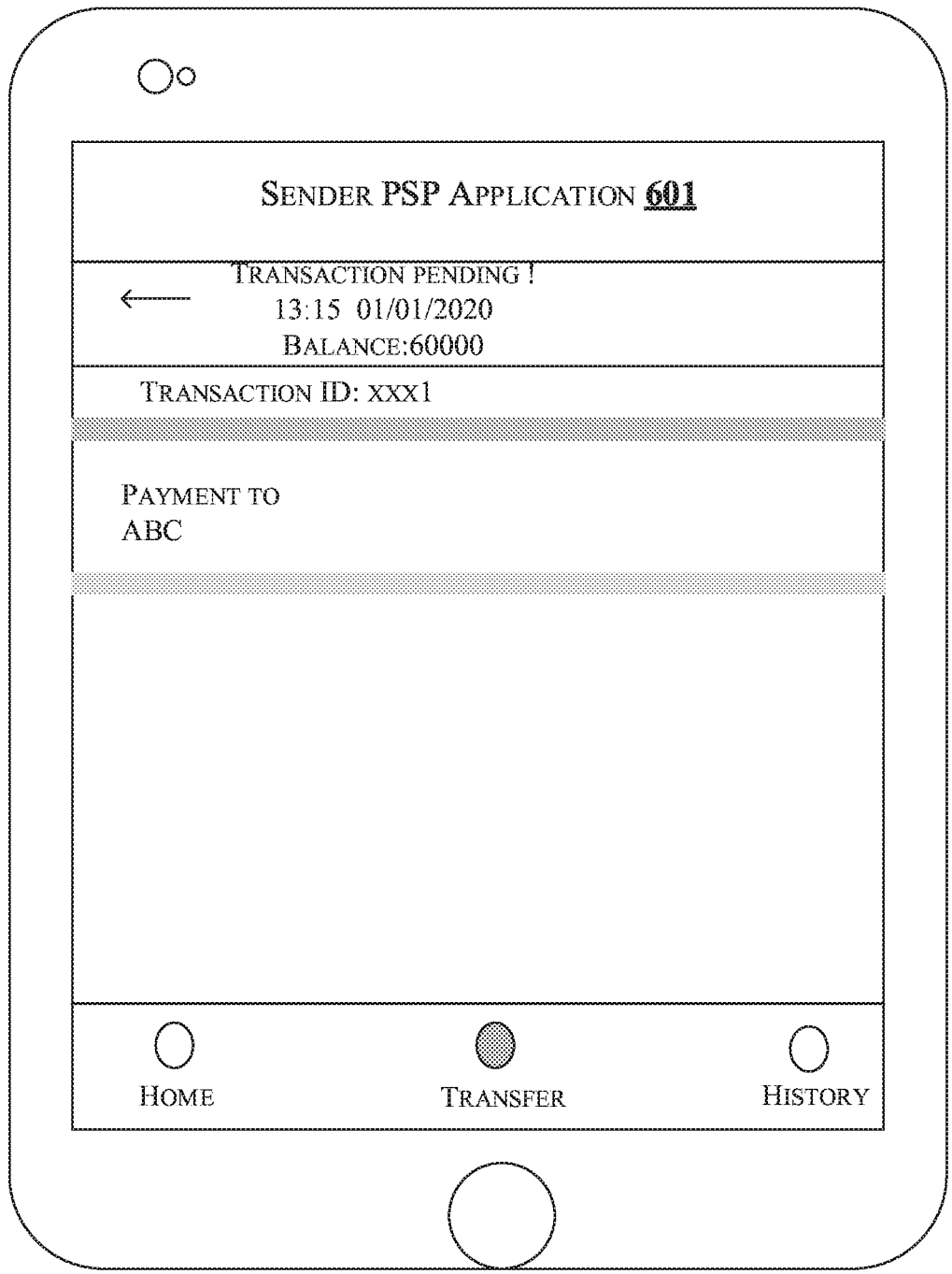
Figure 6D:
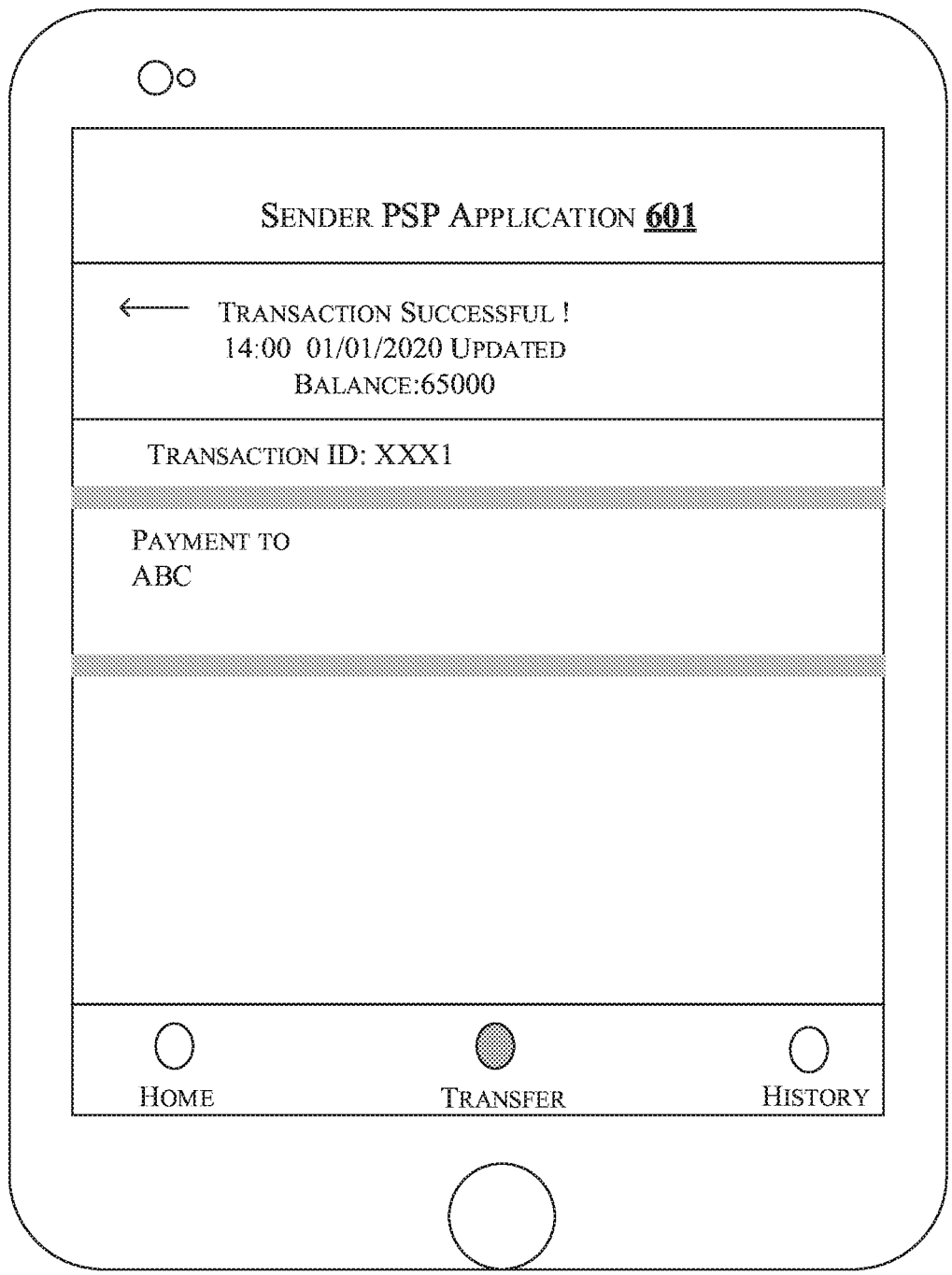
Figure 6E:
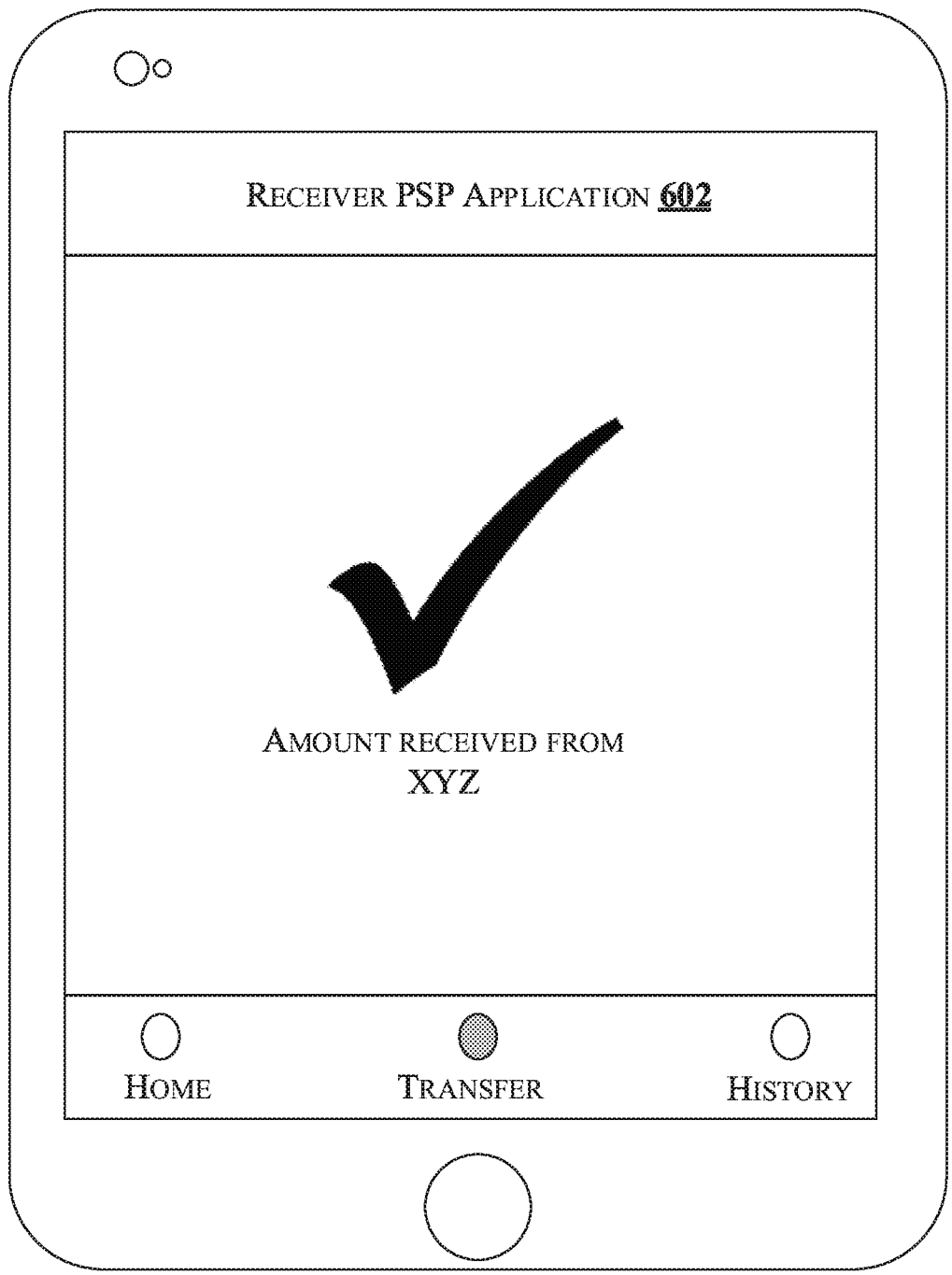
FIG. 6E is an exemplary receiver PSP application, in accordance with some non-limiting embodiments or aspects of the present disclosure.

FIGS. 6A-6D illustrate an exemplary sender PSP application (601) and FIG. 6E illustrates an exemplary receiver PSP application (602). As shown in FIG. 6A, the sender PSP application (601) may provide options like "home", "transfer" and "history". The sender (101) may select the "transfer" option. The sender PSP application (601) may provide fields like recipient number, recipient name, and amount for the sender (101) to enter. In some non-limiting embodiments or aspects, the sender (101) may provide only the recipient name, and the recipient number may be fetched by the sender PSP application (601) from the contacts of the sender (101).

The sender (101) may make a first transaction (e.g., 5000 USD) to the receiver (105). The sender (101) may enter a recipient number (e.g., 98XXXXXX01), a recipient name (e.g., ABC), and amount (e.g., 5000). After entering the details for making the transfer, the sender (101) may select the "Send" option to initiate the transaction. The first transaction may be pending and the status of the first transaction may be displayed as shown in FIG. 6B. The first transaction may be associated with the transaction ID (e.g., XXX0) and a timestamp (e.g., 12:15 Jan. 1, 2020). The balance of the sender (101) may be displayed as 65000 USD after the first transaction. The sender PSP application (601) may show other details like transaction is pending for payment made to ABC. Since the first transaction is pending, the sender (101) may make a subsequent transaction of the same amount, 5000 USD to the receiver (105).

As shown in FIG. 6C, the subsequent transaction may be associated with the transaction ID (e.g., XXX1) and a timestamp (e.g., 13:15 Jan. 1, 2020). The balance of the sender (101) may be displayed as 60000 USD after the subsequent transaction. The sender PSP application (601) may show other details like the transaction is pending for payment made to ABC. The sender PSP server (102) may monitor the first transaction and the subsequent transaction simultaneously to identify a successful transaction. As shown in FIG. 6D, the subsequent transaction with transaction ID XXX1 may become successful at a timestamp 14:00. The sender PSP server (102) or the receiver PSP server (104) may discard the first transaction and update the sender balance as 65000. FIG. 6E shows a receiver PSP application (602) indicating receipt of the amount from the sender (101) (e.g., XYZ).

In a non-limiting example, a first person may initiate a first transaction. The first person may send 500 USD to a second person. The sender PSP server (102) may receive the indication message from the RTP server (103) that the first transaction is pending. The first person may initiate a subsequent transaction with the same amount of 500 USD to the second person. The sender PSP server (102) may receive the indication message from the RTP server (103) that the second transaction is also pending. The sender PSP server (102) may compare the transaction parameters of the first transaction and the second transaction to determine that the first transaction and the second transaction are associated with the single payment from the first person to the second person. The first person may initiate a third transaction with same amount of 500 USD to the second person. The sender PSP server (102) may receive the indication message from the RTP server (103) that the third transaction is also pending.

The sender PSP server (102) may compare the transaction parameters of the first transaction and the third transaction to determine that the first transaction and the third transaction are associated with the single payment from the first person to the second person. The first person may initiate a fourth transaction with same amount of 500 USD to the second person. The sender PSP server (102) may receive the indication message from the RTP server (103) that the fourth transaction is also pending. The sender PSP server (102) may compare the transaction parameters of the first transaction and the fourth transaction to determine that the first transaction and the fourth transaction are associated with the single payment from the first person to the second person. The sender PSP server (102) may simultaneously process the first transaction, the second transaction, the third transaction, and the fourth transaction. The sender PSP server (102) may receive an indication message that the third transaction is successful in a certain time after the third transaction is processed. The sender PSP server (102) transmits the one or messages to discard the first transaction, the second transaction, and the fourth transaction. The sender PSP server (102) or the receiver PSP server (104) discards the first transaction, the second transaction, and the fourth transaction and updates the balance of the sender.

The present disclosure is not limited for online transactions. For example, the present disclosure may be used at a Point of Sale (POS) machine in a store. When a user makes a first transaction using the POS machine, and when the payment is pending, the user may make a subsequent transaction. Here, a merchant server associated with the POS machine may determine that the subsequent transaction and the first transaction are related to a single payment and may assign the pending IDs to both the first and the subsequent transactions. Further, the merchant server may perform the steps of 201 to 205 of FIG. 2 to determine a successful transaction among the first and the subsequent transaction and discard the other transaction. Further, the user may be credited with the amount for the redundant transactions.

The present disclosure provides an automatic way to discard multiple pending (redundant) transactions after one transaction from the multiple transactions being successful. The present disclosure provides a method to intelligently identify and manage multiple transactions of a user associated with the single payment. The present disclosure eliminates the user money being debited multiple times.

Computer System

Figure 7:
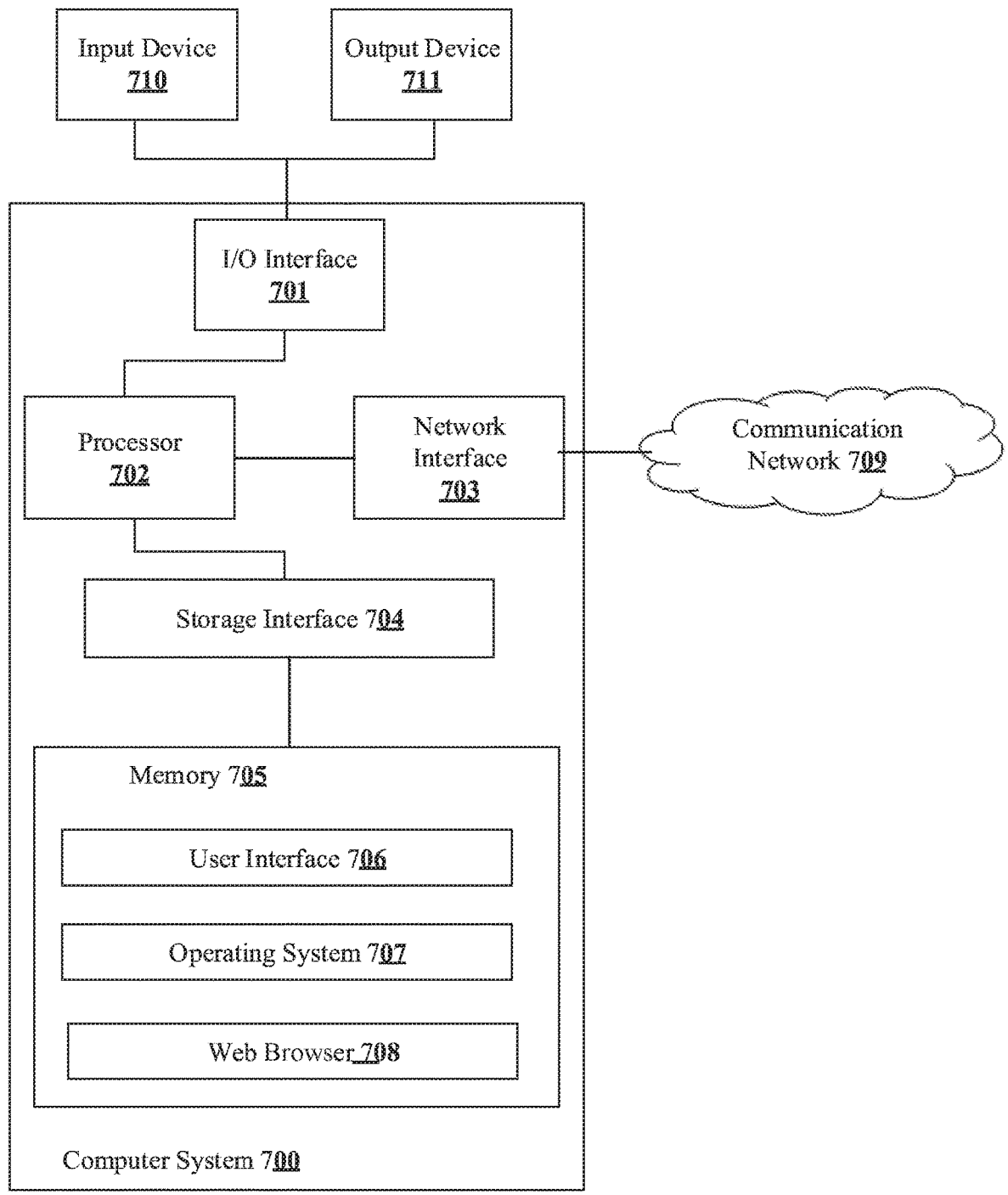
FIG. 7 is a block diagram of a general-purpose computer system for managing pending transactions, in accordance with embodiments of the present disclosure.

FIG. 7 illustrates a block diagram of an exemplary computer system (700) for implementing embodiments consistent with the present disclosure. In some non-limiting embodiments or aspects, the computer system (700) is used to implement a generation of sentiment-based summary for user reviews. The computer system (700) may comprise a central processing unit ("CPU" or "processor") (702). The processor (702) may comprise at least one data processor. The processor (702) may include specialized processing units such as integrated system (bus) controllers, memory management control units, floating point units, graphics processing units, digital signal processing units, etc.

The processor (702) may be disposed in communication with one or more input/output (I/O) devices (not shown) via an I/O interface (701). The I/O interface (701) may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), Radio Frequency (RF) antennas, S-Video, VGA, IEEE 802.n/b/g/n/x, Bluetooth®, cellular (e.g., code-division multiple access (CDMA), high-speed packet access (HSPA+), global system for mobile communications (GSM), long-term evolution (LTE), WiMax®, or the like), etc.

Using the I/O interface (701), the computer system (700) may communicate with one or more I/O devices. For example, an input device (710) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. An output device (711) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

The processor (702) may be disposed in communication with a communication network (709) via a network interface (703). The network interface (703) may communicate with the communication network (709). The network interface (703) may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network (709) may include, without limitation, a direct interconnection, local area network (LAN), wide area network (WAN), wireless network (e.g., using Wireless Application Protocol), the Internet, etc. The network interface (703) may employ connection protocols including, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network (709) includes, but is not limited to, a direct interconnection, an e-commerce network, a peer to peer (P2P) network, local area network (LAN), wide area network (WAN), wireless network (e.g., using Wireless Application Protocol), the Internet, Wi-Fi®, and such. The first network and the subsequent network may either be a dedicated network or a shared network, which represents an association of the different types of networks that use a variety of protocols, e.g., Hypertext Transfer Protocol (HTTP), Transmission Control Protocol/Internet Protocol (TCP/IP), Wireless Application Protocol (WAP), etc., to communicate with each other. Further, the first network and the subsequent network may include a variety of network devices, including routers, bridges, servers, computing devices, storage devices, etc.

In some non-limiting embodiments or aspects, the processor (702) may be disposed in communication with a memory (705) (e.g., RAM, ROM, etc. not shown in FIG. 7) via a storage interface (704). The storage interface (704) may connect to memory (705) including, without limitation, memory drives, removable disc drives, etc., employing connection protocols such as serial advanced technology attachment (SATA), Integrated Drive Electronics (IDE), IEEE-1394, USB, fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (705) may store a collection of program or database components, including, without limitation, a user interface (706), an operating system (707), web browser (708), etc. In some non-limiting embodiments or aspects, computer system (700) may store user/application data, such as the data, variables, records, etc., as described in this disclosure. Such databases may be implemented as fault-tolerant, relational, scalable, secure databases such as Oracle® or Sybase®.

The operating system (707) may facilitate resource management and operation of the computer system (700). Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT WINDOWS® (XP™, VISTA™/7/8, 10 etc.), APPLE® IOS™ GOOGLE® ANDROID™, BLACKBERRY® OS, or the like.

In some non-limiting embodiments or aspects, the computer system (700) may implement a web browser (708) stored program component. The web browser (708) may be a hypertext viewing application, e.g., MICROSOFT® INTERNET EXPLORER®, GOOGLE® CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers (708) may utilize facilities such as AJAX™, DHTML™, ADOBE® FLASH®, JAVASCRIPT®, JAVA®, Application Programming Interfaces (APIs), etc. In some non-limiting embodiments or aspects, the computer system (700) may implement a mail server (not shown in FIG. 7) stored program component. The mail server may be an Internet mail server such as Microsoft® Exchange, or the like. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® Exchange, Post Office Protocol (POP), Simple Mail Transfer Protocol (SMTP), or the like. In some non-limiting embodiments or aspects, the computer system (700) may implement a mail client stored program component. The mail client (not shown in FIG. 7) may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, e.g., be non-transitory. Examples include RAM, ROM, volatile memory, non-volatile memory, hard drives, Compact Disk (CD) ROMs, DVDs, flash drives, disks, and any other known physical storage media.

The described operations may be implemented as a method, system, or article of manufacture using standard programming and/or engineering techniques to produce software, firmware, hardware, or any combination thereof. The described operations may be implemented as code maintained in a "non-transitory computer-readable medium", where a processor may read and execute the code from the computer-readable medium. The processor is at least one of a microprocessor and a processor capable of processing and executing the queries. A non-transitory computer-readable medium may include media, such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, and the like), and the like. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), and the like).

An "article of manufacture" includes non-transitory computer readable medium and/or hardware logic in which code may be implemented. A device in which the code implementing the described embodiments of operations are encoded may include a computer-readable medium or hardware logic. Of course, those skilled in the art will recognize that many modifications may be made to this configuration without departing from the scope of the disclosure and that the article of manufacture may include suitable information bearing medium known in the art.

The terms "an embodiment", "embodiment", "embodiments", "the embodiment", "the embodiments", "one or more embodiments", "some non-limiting embodiments or aspects", and "one embodiment" mean "one or more (but not all) embodiments of the disclosure" unless expressly specified otherwise.

A description of an embodiment with several components in communication with each other does not imply that all such components are required. On the contrary, a variety of optional components is described to illustrate the wide variety of possible embodiments of the disclosure.

The terms "including", "comprising", "having", and variations thereof mean "including but not limited to" unless expressly specified otherwise. The enumerated listing of items does not imply that any or all of the items are mutually exclusive unless expressly specified otherwise. The terms "a", "an", and "the" mean "one or more" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

The illustrated operations of FIGS. 2, 3, and 5 show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope and spirit being indicated by the following claims.

What is claimed is:

1. A computer-implemented method comprising:
identifying, by a sender Payment Service Provider (PSP) server, a first transaction from a sender made via the sender PSP server to a receiver via a receiver PSP server, wherein a Real-Time Payment (RTP) server facilitates transactions between the sender PSP server and the receiver PSP server;
detecting, by the sender PSP server, at least one subsequent transaction from the sender to the receiver, when the first transaction is pending at the receiver PSP server;
comparing, by the sender PSP server, transaction parameters of the at least one subsequent transaction with transaction parameters of the first transaction when the first transaction is pending at the receiver PSP server;
determining, by the sender PSP server, that the first transaction and the at least one subsequent transaction are associated with a single payment made by the sender to the receiver;
identifying, by the sender PSP server, one of the first transaction and the at least one subsequent transaction as successful by monitoring the first transaction and the at least one subsequent transaction; and
transmitting, by the sender PSP server, one or more messages based on the monitoring, wherein the one or more messages indicate that one of the first transaction and the at least one subsequent transaction is successful and to discard other transactions among the first transaction and the at least one subsequent transaction, wherein the other transactions are discarded by at least one of the sender PSP server and the receiver PSP server based on the one or more messages.

2. The computer-implemented method of claim 1, wherein the transaction parameters may be at least one of the following: a transaction Identifier (ID), an amount, a currency, a mobile number of the sender and the receiver, a time stamp, a unique identification number of the sender and the receiver, a device fingerprint data of the sender, or any combination thereof.

3. The computer-implemented method of claim 1, further comprising assigning a unique pending Identifier (ID) for each of the first transaction and the at least one subsequent transaction, when a status of a respective transaction is updated by the RTP server as pending in a pay response code, wherein the RTP server generates the pay response code in response to receiving a pay request code from the sender PSP server, and wherein the pay response code is generated based on a response provided by the receiver PSP server.

4. The computer-implemented method of claim 3, wherein the status of the first transaction and the at least one subsequent transaction is updated as pending in the pay response code when one of: the first transaction and the at least one subsequent transaction is initiated and is being processed; and a response is not received from the receiver PSP server for the respective transaction within a predetermined time.

5. The computer-implemented method of claim 1, wherein processing of the first transaction and the at least one subsequent transaction is performed by the sender PSP server simultaneously.

6. The computer-implemented method of claim 3, wherein the one or more messages are updated with a void command along with the unique pending ID of the successful transaction, wherein the one or more messages are according to ISO 8583 standard.

7. A sender Payment Service Provider (PSP) server comprising:
one or more processors, and
a memory communicatively coupled to the one or more processors, wherein the memory stores processor-executable instructions, which, on execution, cause the one or more processors to:
identify a first transaction from a sender made via the sender PSP server to a receiver via a receiver PSP server, wherein a Real-Time Payment (RTP) server facilitates transactions between the sender PSP server and the receiver PSP server;
detect at least one subsequent transaction from the sender to the receiver, when the first transaction is pending at the receiver PSP server;
compare transaction parameters of the at least one subsequent transaction with transaction parameters of the first transaction when the first transaction is pending at the receiver PSP server;
determine that the first transaction and the at least one subsequent transaction are associated with a single payment made by the sender to the receiver;
identify one of the first transaction and the at least one subsequent transaction as successful by monitoring the first transaction and the at least one subsequent transaction; and
transmit one or more messages based on the monitoring, wherein the one or more messages indicate that one of the first transaction and the at least one subsequent transaction is successful and to discard other transactions among the first transaction and the at least one subsequent transaction, wherein the other transactions are discarded by at least one of the sender PSP server and the receiver PSP server based on the one or more messages.

8. The sender PSP server of claim 7, further comprising assigning by the one or more processors a unique pending Identifier (ID) for each of the first transaction and the at least one subsequent transaction, when a status of a respective transaction is updated by the RTP server as pending in a pay response code, wherein the RTP server generates the pay response code in response to receiving a pay request code from the sender PSP server, wherein the pay response code is generated based on a response provided by the receiver PSP server.

9. The sender PSP server of claim 8, wherein the one or more processors update the status of the first transaction and the at least one subsequent transaction as pending in the pay response code when one of: the first transaction and the at least one subsequent transaction is initiated and is being processed; and a response is not received from the receiver PSP server for the respective transaction within a predetermined time.

10. The sender PSP server of claim 7, wherein the one or more processors process the first transaction and the at least one subsequent transaction simultaneously.

11. The sender PSP server of claim 8, wherein the one or more processors update one or more messages with a void command along with the unique pending ID of the successful transaction, wherein the one or more messages are according to ISO 8583 standard.

12. A non-transitory computer-readable medium including instructions stored thereon that when processed by one or more processors cause a sender Payment Service Provider (PSP) server to perform operations comprising:
- identifying a first transaction from a sender made via the sender PSP server to a receiver via a receiver PSP server, wherein a Real-Time Payment (RTP) server facilitates transactions between the sender PSP server and the receiver PSP server;
- detecting at least one subsequent transaction between the sender and the receiver, when the first transaction is pending at the receiver PSP server;
- comparing one or more transaction parameters of the at least one subsequent transaction with one or more transaction parameters of the first transaction when the first transaction is pending at the receiver PSP server;
- determining that the first transaction and the at least one subsequent transaction are associated with a single payment made by the sender to the receiver;
- identifying one of the first transaction and the at least one subsequent transaction as successful by monitoring the first transaction and the at least one subsequent transaction; and
- transmitting one or more messages based on the monitoring, wherein the one or more messages indicate that one of the first transaction and the at least one subsequent transaction is successful and to discard other transactions among the first transaction and the at least one subsequent transaction, wherein the other transactions are discarded by at least one of the sender PSP server and the receiver PSP server based on the one or more messages.

13. The non-transitory computer-readable medium of claim 12 further comprising assigning, by the one or more processors, a unique pending Identifier (ID) for each of the first transaction and the at least one subsequent transaction, when a status of a respective transaction is updated by the RTP server as pending in a pay response code, wherein the RTP server generates the pay response code in response to receiving a pay request code from the sender PSP server, wherein the pay response code is generated based on a response provided by the receiver PSP server.

14. The non-transitory computer-readable medium of claim 13, wherein the one or more processors update the status of the first transaction and the at least one subsequent transaction as pending in the pay response code when one of: the first transaction and the at least one subsequent transaction is initiated and is being processed; and a response is not received from the receiver PSP server for the respective transaction within a predetermined time.

15. The non-transitory computer-readable medium of claim 12, wherein the one or more processors process the first transaction and the at least one subsequent transaction simultaneously.

16. The non-transitory computer-readable medium of claim 13, wherein the one or more processors update one or more messages with a void command along with the unique pending ID of the successful transaction, wherein the one or more messages are according to ISO 8583 standard.

* * * * *